United States Patent
Chiba et al.

(10) Patent No.: US 11,501,199 B2
(45) Date of Patent: Nov. 15, 2022

(54) PROBABILITY INDEX OPTIMIZATION FOR MULTI-SHOT SIMULATION IN QUANTUM COMPUTING

(71) Applicant: INTERNATIONAL BUSINESS MACHINES CORPORATION, Armonk, NY (US)

(72) Inventors: Hitomi Chiba, Tokyo (JP); Hiroshi Horii, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1046 days.

(21) Appl. No.: 16/180,685

(22) Filed: Nov. 5, 2018

(65) Prior Publication Data

US 2020/0142721 A1    May 7, 2020

(51) Int. Cl.
*G06N 10/80*    (2022.01)
*G06F 17/18*    (2006.01)
(Continued)

(52) U.S. Cl.
CPC .............. *G06N 10/80* (2022.01); *G06F 7/58* (2013.01); *G06F 9/455* (2013.01); *G06F 17/18* (2013.01); *G06F 30/20* (2020.01); *G06N 10/00* (2019.01)

(58) Field of Classification Search
CPC .......... G06N 10/80; G06N 10/00; G06F 7/58; G06F 9/455; G06F 17/18; G06F 30/20;
(Continued)

(56) References Cited

U.S. PATENT DOCUMENTS 9,064,067 B2   6/2015 Wecker
10,650,324 B1 *  5/2020 Rigetti ................... G06F 15/16
(Continued)

OTHER PUBLICATIONS

Sabry, A. "Modeling Quantum Computing in Haskell" Haskell '03: Proceedings of the 2003 ACM SIGPLAN workshop on HaskellAug. 2003 pp. 39-49 https://doi.org/10.1145/871895.871900 [retrieved on Sep. 11, 2021] (Year: 2003).*

(Continued)

*Primary Examiner* — Rehana Perveen
*Assistant Examiner* — Alfred H B Wechselberger
(74) *Attorney, Agent, or Firm* — Tutunjian & Bitetto, P.C.; Randy Emilio Tejada

(57) ABSTRACT

A computer-implemented method is provided for reducing a measure time of a measure process in a multi-shot simulation performed by a quantum computing simulation system. The method includes calculating probabilities from probability amplitudes before the measure process. The method further includes creating, for each node of the quantum computing simulation system, an index of probability by incrementally summing respective different ones of the probabilities into respective sums. The method also includes generating a random number for each of the multi-shots, the random number for sampling a probability distribution of the probabilities. The method additionally includes selecting the index of probability which is larger than the random number by comparing the random number generated for a given one of the multi-shots to the index of probability created for the given one of the multi-shots.

18 Claims, 11 Drawing Sheets

(51) Int. Cl.
*G06F 7/58* (2006.01)
*G06F 9/455* (2018.01)
*G06N 10/00* (2022.01)
*G06F 30/20* (2020.01)

(58) Field of Classification Search
CPC .. G06F 30/3308; G06F 2111/08; G06F 7/582; G06F 30/25; G06F 30/27; G06F 30/28; G06F 2111/00–2119/22
See application file for complete search history.

(56) References Cited

U.S. PATENT DOCUMENTS

| | | | | |
|---|---|---|---|---|
| 2009/0015447 | A1* | 1/2009 | Kilbank | H03M 7/30 341/60 |
| 2015/0234956 | A1* | 8/2015 | Joshi | G06F 30/20 703/2 |
| 2018/0114138 | A1 | 4/2018 | Monroe et al. | |
| 2019/0156239 | A1* | 5/2019 | Martinis | G06N 10/00 |

OTHER PUBLICATIONS

Hong et al. "A Universal Quantum Computing Virtual Machine" (Last revised Oct. 2018) arXiv:1806.06511 [quant-ph] [retrieved on Feb. 8, 2022] (Year: 2018).*

McCaskey et al. "A language and hardware independent approach to quantum-classical computing" (Online Aug. 2018) SoftwareX 7 (2018) 245-254 [retrieved on Feb. 9, 2022] (Year: 2018).*

Nielsen et al. "QCAD Simulation and Optimization of Semiconductor Double Quantum Dots" Sandia Report, SAND2013-10575 [retrieved on Feb. 8, 2022] (Year: 2013).*

Michielsen et al. "QCE: A Simulator for Quantum Computer Hardware" Turk J Phys 27 (2003), 343-370 [retrieved on Oct. 7, 2020] (Year: 2003).*

Behera et al. "Experimental realization of quantum cheque using a five-qubit quantum computer" Quantum Inf Process (2017) 16: 312; DOI 10.1007/s11128-017-1762-0 [retrieved on Oct. 7, 2020] (Year: 2017).*

Humeniuk, S. "Quantum Monte Carlo Studies of Strongly Correlated Systems for Quantum Simulators" [Thesis] Universitat Stuttgart Available Jul. 31, 2018 [retrieved on Aug. 1, 2022] (Year: 2018).*

Bettelli et al. "Toward an architecture for quantum programming" European Physics Journal D, vol. 25, pp. 181-200 (2003) DOI: 10.1140/epjd/e2003-00242-2 [retrieved on Feb. 7, 2022] (Year: 2003).*

Smith et al. "Development and performance of a mixed OpenMP/MPI quantum Monte Carlo code" Concurrency: Practice and Experience, vol. 12, p. 1121-1129 (2000) [retrieved on Aug. 1, 2022] (Year: 2000).*

Garcia et al., "Simulation of Quantum Circuits via Stabilizer Frames", arXiv:1712.03554v1 [cs.DS] Dec. 10, 2017, 18 pages.

Fischer, "A Parallel Quantum Computer Simulator", Calhoun: The NPS Institutional Archive DSpace Repository, Thesis, Sep. 2016, 130 pages.

* cited by examiner

PROBABILITY INDEX OPTIMIZATION FOR MULTI-SHOT SIMULATION IN QUANTUM COMPUTING

BACKGROUND

Technical Field

The present invention generally relates to quantum computing, and more particularly to a probability index optimization for multi-shot simulation in quantum computer.

Description of the Related Art

A gate-based quantum computer is a device that takes input data and transforms this input data according to a unitary operation, specified as a sequence of gate operations and measurements and conveniently represented by a quantum circuit. In Quantum Computing (QC), a QC simulator behavior updates a probability distribution for a gate operation, determines 0 or 1 for a qubit for a measure operation, and outputs a value by aggregating determined bits (single shot). Multiple shots can produce a value distribution. In IBM Q®, the default number of shots is 1K. Hence, a naïve simulator calculates 1K times even if the final probability distribution is the same.

In one conventional approach, the distribution of probability amplitudes is calculated on once and values of the distribution are sampled 1 k times. In addition, in another conventional approach, a probability array is created for the first shot and values of the array are sampled to reduce the calculating cost. Accordingly, there is a need for a probability index optimization for multi-shot simulation in quantum computing.

SUMMARY

According to an aspect of the present invention, a computer-implemented method is provided for reducing a measure time of a measure process in a multi-shot simulation performed by a quantum computing simulation system. The method includes calculating probabilities from probability amplitudes before the measure process. The method further includes creating, for each node of the quantum computing simulation system, an index of probability by incrementally summing respective different ones of the probabilities into respective sums. The method also includes generating a random number for each of the multi-shots, the random number for sampling a probability distribution of the probabilities. The method additionally includes selecting the index of probability which is larger than the random number by comparing the random number generated for a given one of the multi-shots to the index of probability created for the given one of the multi-shots.

According to another aspect of the present invention, a computer program product is provided for reducing a measure time of a measure process in a multi-shot simulation performed by a quantum computing simulation system. The computer program product includes a non-transitory computer readable storage medium having program instructions embodied therewith. The program instructions are executable by a computer to cause the computer to perform a method. The method includes calculating probabilities from probability amplitudes before the measure process. The method further includes creating, for each node of the quantum computing simulation system, an index of probability by incrementally summing respective different ones of the probabilities into respective sums. The method also includes generating a random number for each of the multi-shots, the random number for sampling a probability distribution of the probabilities. The method additionally includes selecting the index of probability which is larger than the random number by comparing the random number generated for a given one of the multi-shots to the index of probability created for the given one of the multi-shots.

According to yet another aspect of the present invention, a quantum computing simulation system is provided for reducing a measure time of a measure process in a multi-shot simulation. The system includes a set of local nodes for calculating probabilities from probability amplitudes before the measure process. The system further includes a master node for creating, each of the nodes from among the master and local nodes, an index of probability by incrementally summing respective different ones of the probabilities into respective sums, and generating a random number for each of the multi-shots, the random number for sampling a probability distribution of the probabilities. The local nodes select the index of probability which is larger than the random number by comparing the random number generated for a given one of the multi-shots to the index of probability created for the given one of the multi-shots.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to a probability index optimization for multi-shot simulation in quantum computer.

In an embodiment, the present invention can a probability index to reduce execution time for a measure when a measure gate is not in the middle of a program.

In an embodiment, the present invention generates a probability distribution index and uses the index to sample each shot as follows: (1) generate an index which is the sum of the probability distribution; (2) generate a random number for each slot in the index; (3) use a sampling bit with the random number and the index.

Accordingly, in one or more embodiments, the present invention can advantageously reduce the execution time of multi-shot simulation for a quantum computer in a stand-alone as well as multi-node environments.

The present invention can be used to improve benchmarking results of quantum computers as well as in manufacturing quantum computers with improved calculation efficiency. These and other applications to which the present invention can be applied are readily determined by one ordinary skill in the art given the teachings of the present invention provided herein, while maintaining the spirit of the present invention.

Figure 1:
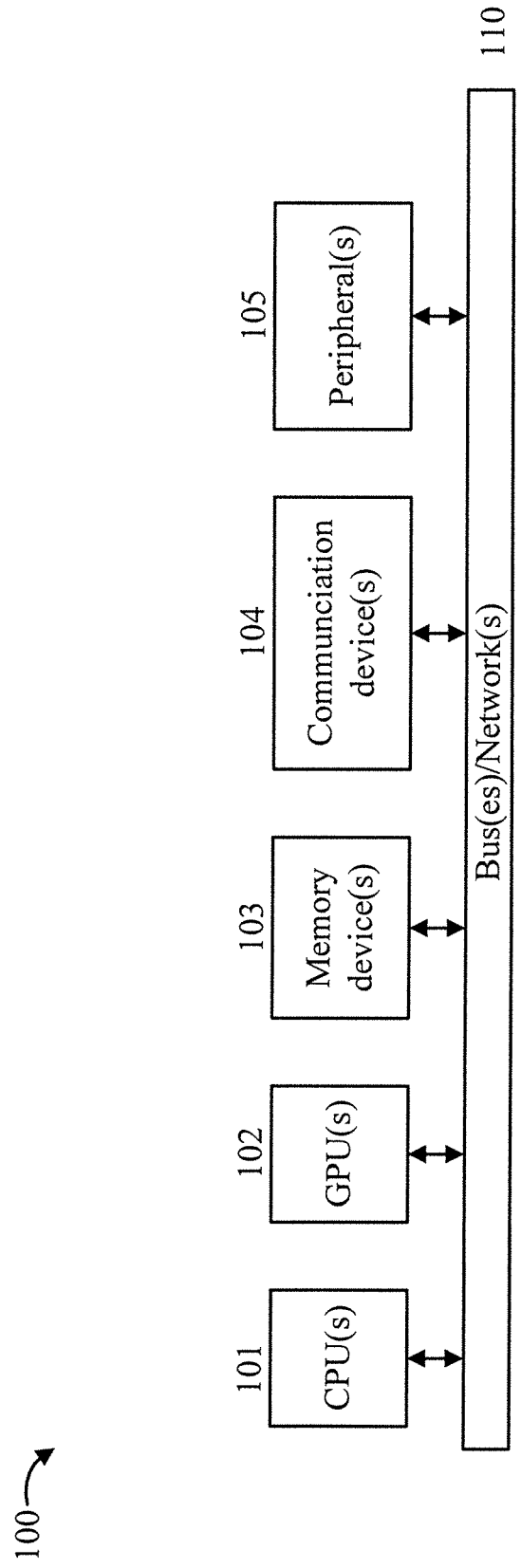
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 10-11). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
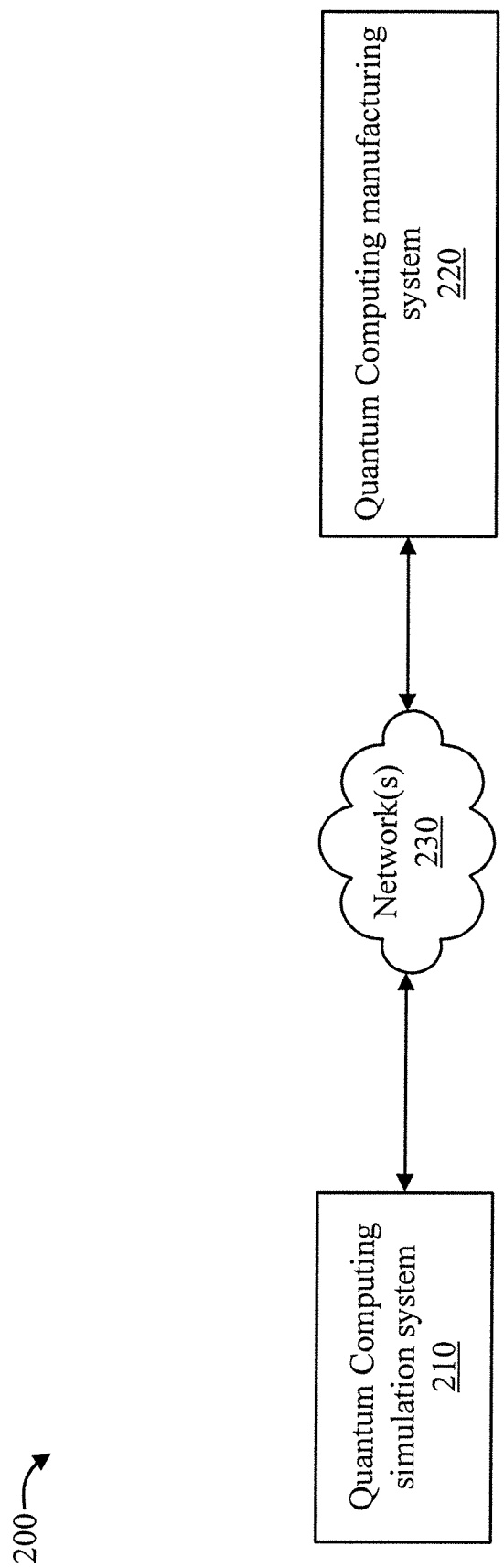
FIG. 2 is a block diagram showing an exemplary environment to which the present invention can be applied, in accordance with an embodiment of the present invention.

FIG. 2 is a block diagram showing an exemplary environment 200 to which the present invention can be applied, in accordance with an embodiment of the present invention.

The environment 200 includes a Quantum Computing (QC) simulation system 210 and a QC manufacturing system 220. Results and insights gained from the use of the QC simulation system 210 can be provide to the QC manufacturing system in order to improve the operation of quantum computing machines made by the QC manufacturing system 220.

In an embodiment, communications between the systems 210 and 220 can occur over one or more networks, collectively represented by the figure reference numeral 230. In other embodiments, other types of connections can be used. Moreover, in an embodiment, the simulation system 210 can be incorporated into and part of the manufacturing system 220. These and other variations are readily determined by one of ordinary skill in the art given the teachings of the present invention provided herein, while maintaining the spirit of the present invention.

Figure 3:
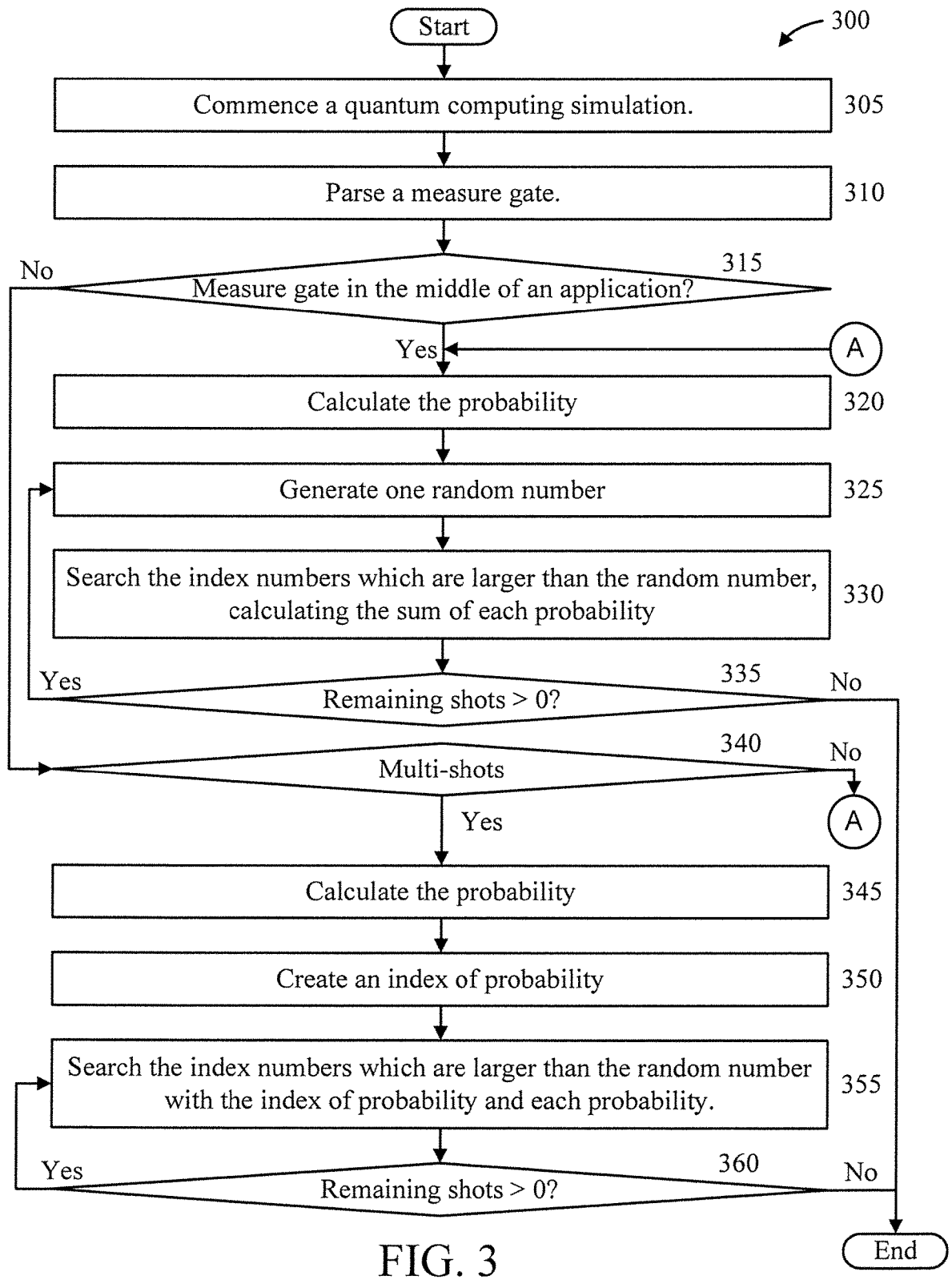
FIG. 3 is a flow diagram showing an exemplary method for probability index optimization for multi-shot simulation in quantum computing, in accordance with an embodiment of the present invention.

FIG. 3 is a flow diagram showing an exemplary method 300 for probability index optimization for multi-shot simulation in quantum computing, in accordance with an embodiment of the present invention.

At block 305, commence a quantum computing simulation.

At block 310, parse a measure gate.

At block 315, determine whether or not the measure gate is in the middle of a program. If so, the proceed to block 320. Otherwise, proceed to block 340.

At block 320, calculate the probability (of a qubit being a 0 or 1 for a measure operation by the measure gate).

At block 325, generate one random number.

At block 330, search the index numbers which are larger than the random number, calculating the sum of each probability.

At block 335, determine whether or not the remaining number of shots is greater than zero. If so, then return to block 325. Otherwise, terminate the method.

At block 340, determine whether or not there are the multiple shots (multi-shots). If so, the proceed to block 345. Otherwise, proceed to block 320.

At block 345, calculate the probability (of a qubit being a 0 or 1 for a measure operation by the measure gate for a current shot).

At block 350, create an index of probability (interchangeably referred to herein as "probability index").

At block 355, search the index numbers which are larger than the random number with the index of probability and each probability.

At block 360, determine whether or not the number of remaining shots is greater than zero. If so, then return to block 355 (to process the next shot). Otherwise, terminate the method.

Figure 4:
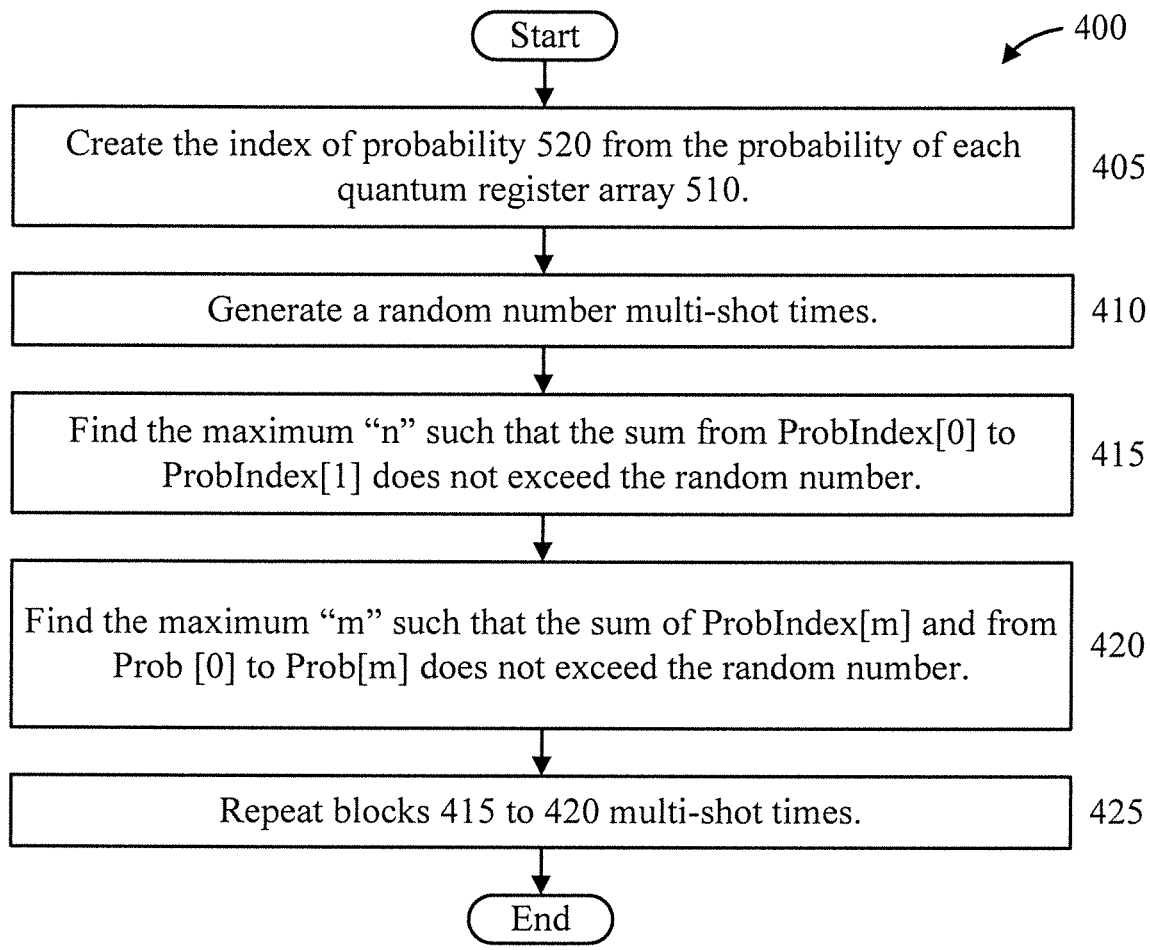
FIG. 4 is a flow diagram showing an exemplary method for index creation and measurement for a single node, in accordance with an embodiment of the present invention.
Figure 5:
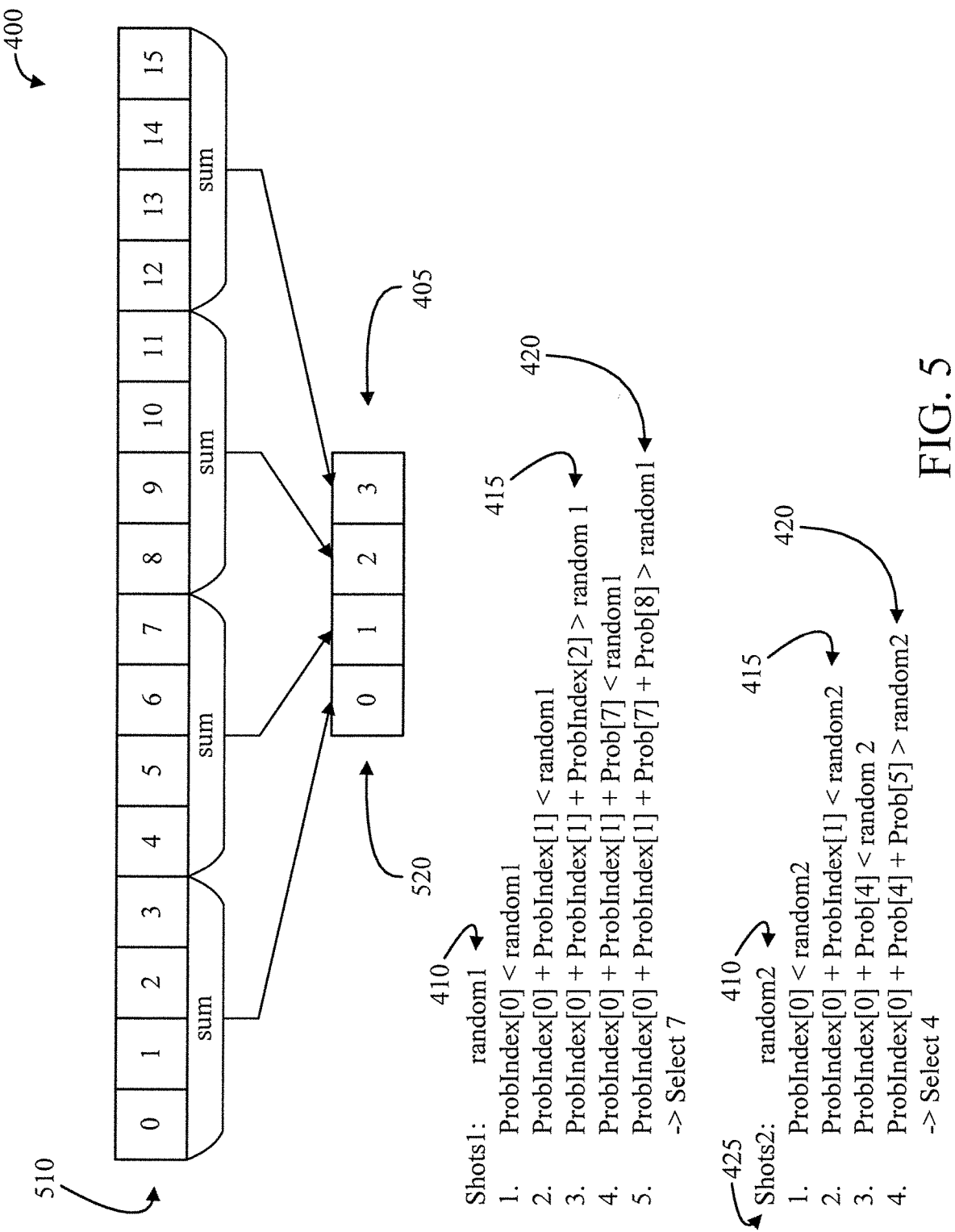
FIG. 5 is a diagram graphically illustrating the method of FIG. 4, in accordance with an embodiment of the present invention.

FIG. 4 is a flow diagram showing an exemplary method 400 for index creation and measurement for a single node, in accordance with an embodiment of the present invention. FIG. 5 is a diagram graphically illustrating the method 400 of FIG. 4, in accordance with an embodiment of the present invention. The method presupposes the availability of a probability of each quantum register array 510.

At block 405, create the index of probability 520 from the probability of each quantum register array 510.

At block 410, generate a random number multi-shot times. Hence, in this example, random1 and random 2 are generated.

At block 415, find the maximum "n" such that the sum from ProbIndex[0] to ProbIndex[1] does not exceed the random number.

At block 420, find the maximum "m" such that the sum of ProbIndex[m] and from Prob [0] to Prob[m] does not exceed the random number. Hence, for random1, select 7; for random2, select 4.

At block 425, repeat blocks 415 to 420 multi-shot times.

Figure 6:
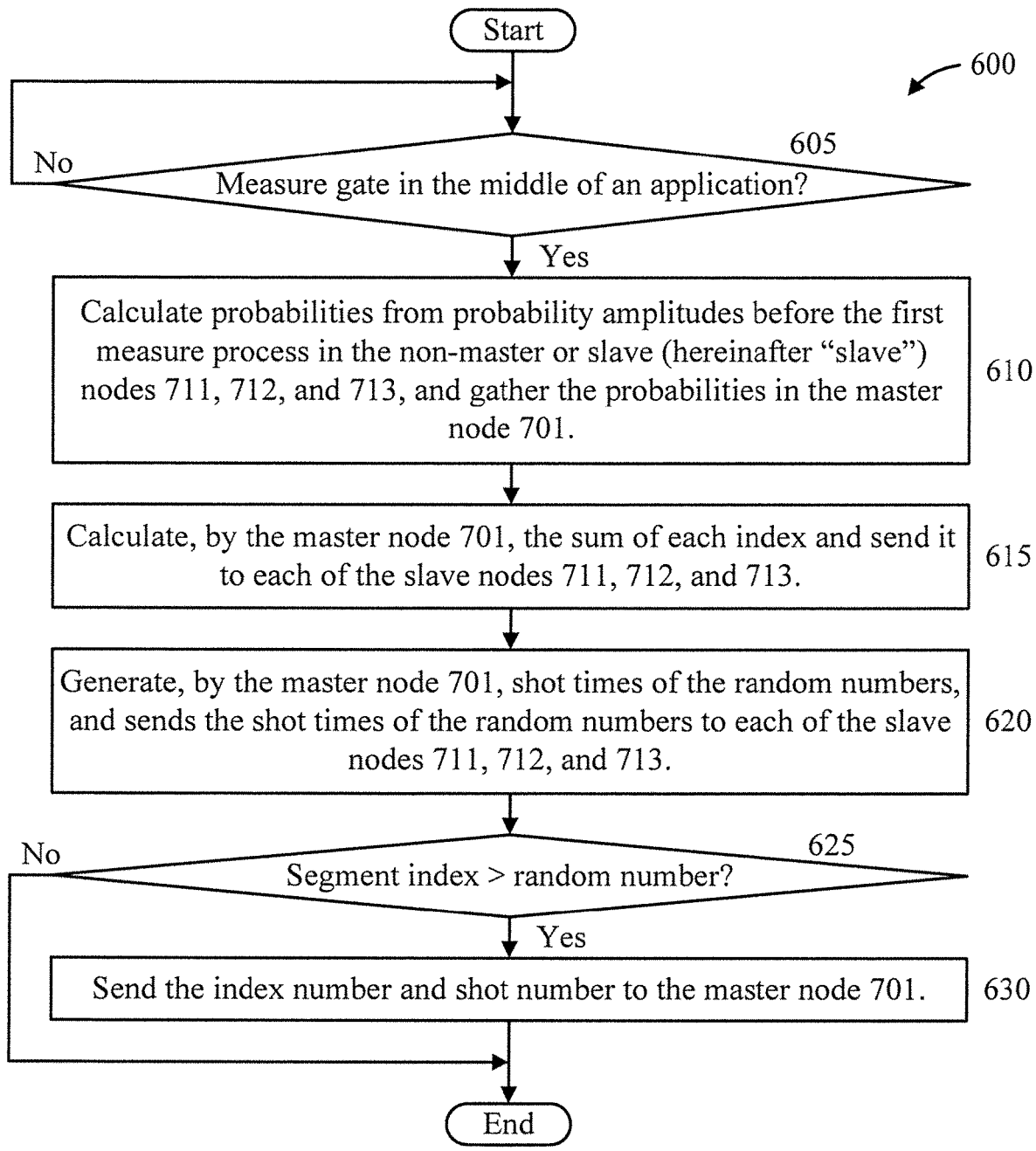
FIG. 6 is a flow diagram showing an exemplary method for index creation and measurement for multiple nodes (multi-node), in accordance with an embodiment of the present invention.
Figure 7:
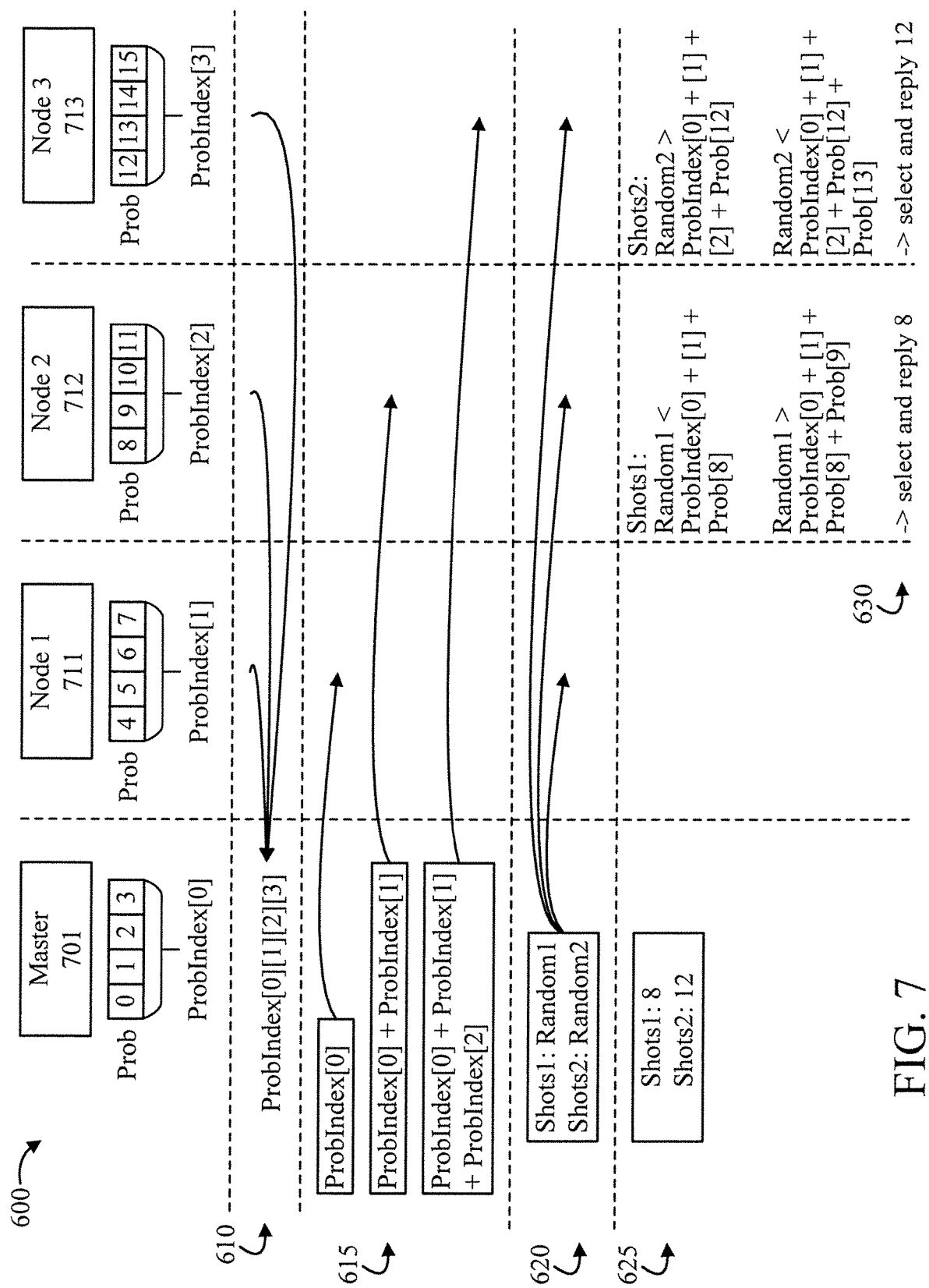
FIG. 7 is a diagram graphically illustrating the method of FIG. 6, in accordance with an embodiment of the present invention.

FIG. 6 is a flow diagram showing an exemplary method 600 for index creation and measurement for multiple nodes (multi-node), in accordance with an embodiment of the present invention. FIG. 7 is a diagram graphically illustrating the method 600 of FIG. 6, in accordance with an embodiment of the present invention. For the sake of illustration, FIG. 7 shows a master node and slave nodes 1-3, respectively denoted by figure reference numerals 701, 711, 712, and 713, respectively.

At block 605, determine whether or not a measure gate is not in the middle of a program and multi-shot simulation. If so, the proceed to block 610. Otherwise, return to block 605.

At block 610, calculate probabilities from probability amplitudes before the first measure process in the non-master or slave (hereinafter "slave") nodes 711, 712, and 713 and gather the probabilities in the master node 701.

At block 615, calculate, by the master node 701, the sum of each index and send it to each of the slave nodes 711, 712, and 713.

At block 620, generate, by the master node 701, shot times of the random numbers, and sends the shot times of the random numbers to each of the slave nodes 711, 712, and 713.

At block 625, determine, by each slave node 711, 712, and 713, whether the node has the segment whose index is larger than the random number by each node comparing the random value and sum of its own index. If so, then proceed to block 630. Otherwise, terminate the method.

At block 630, send the index number and shot number to the master node.

Figure 8:
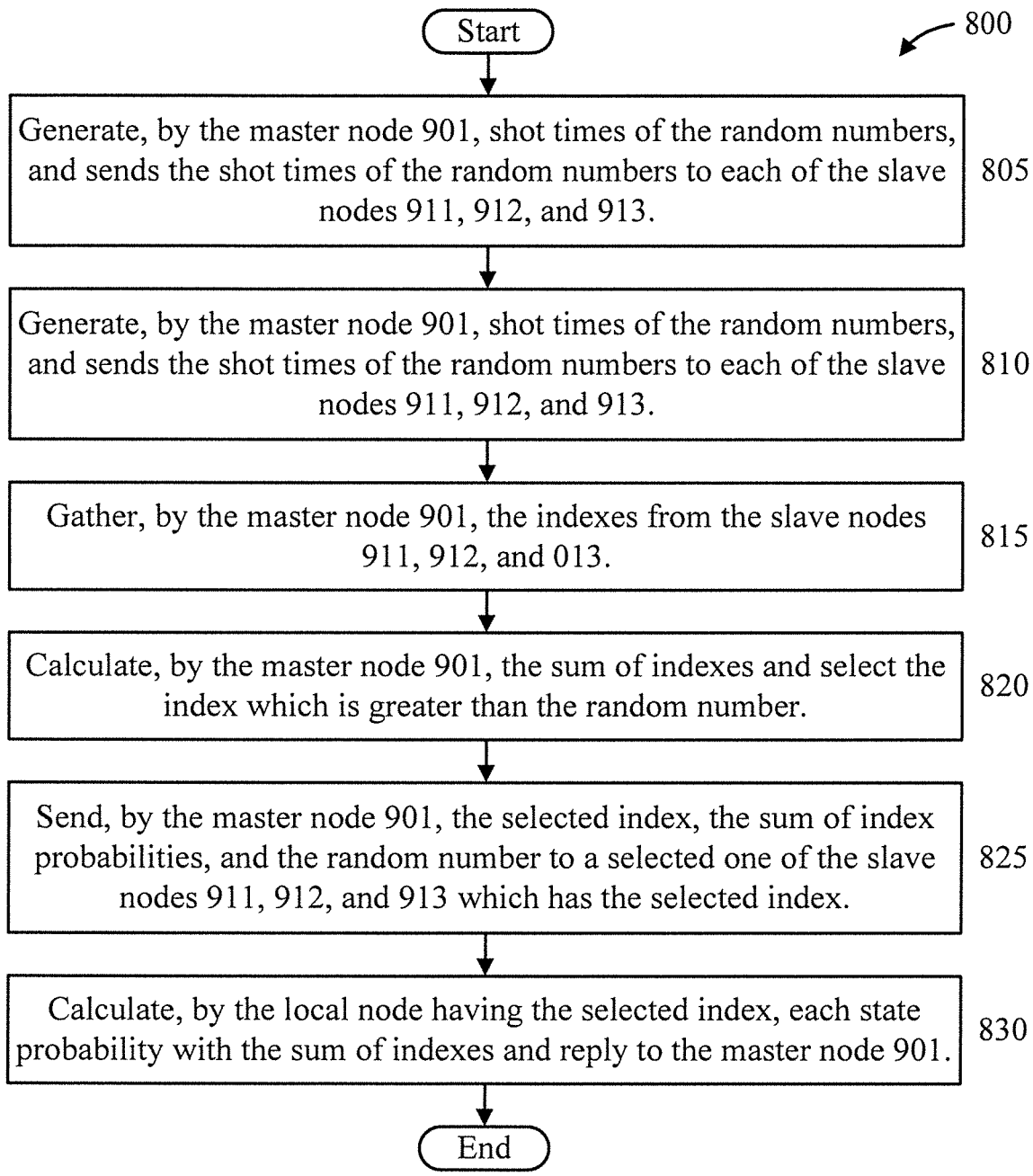
FIG. 8 is a flow diagram showing another exemplary method for index creation and measurement for multiple nodes (multi-node), in accordance with an embodiment of the present invention.
Figure 9:
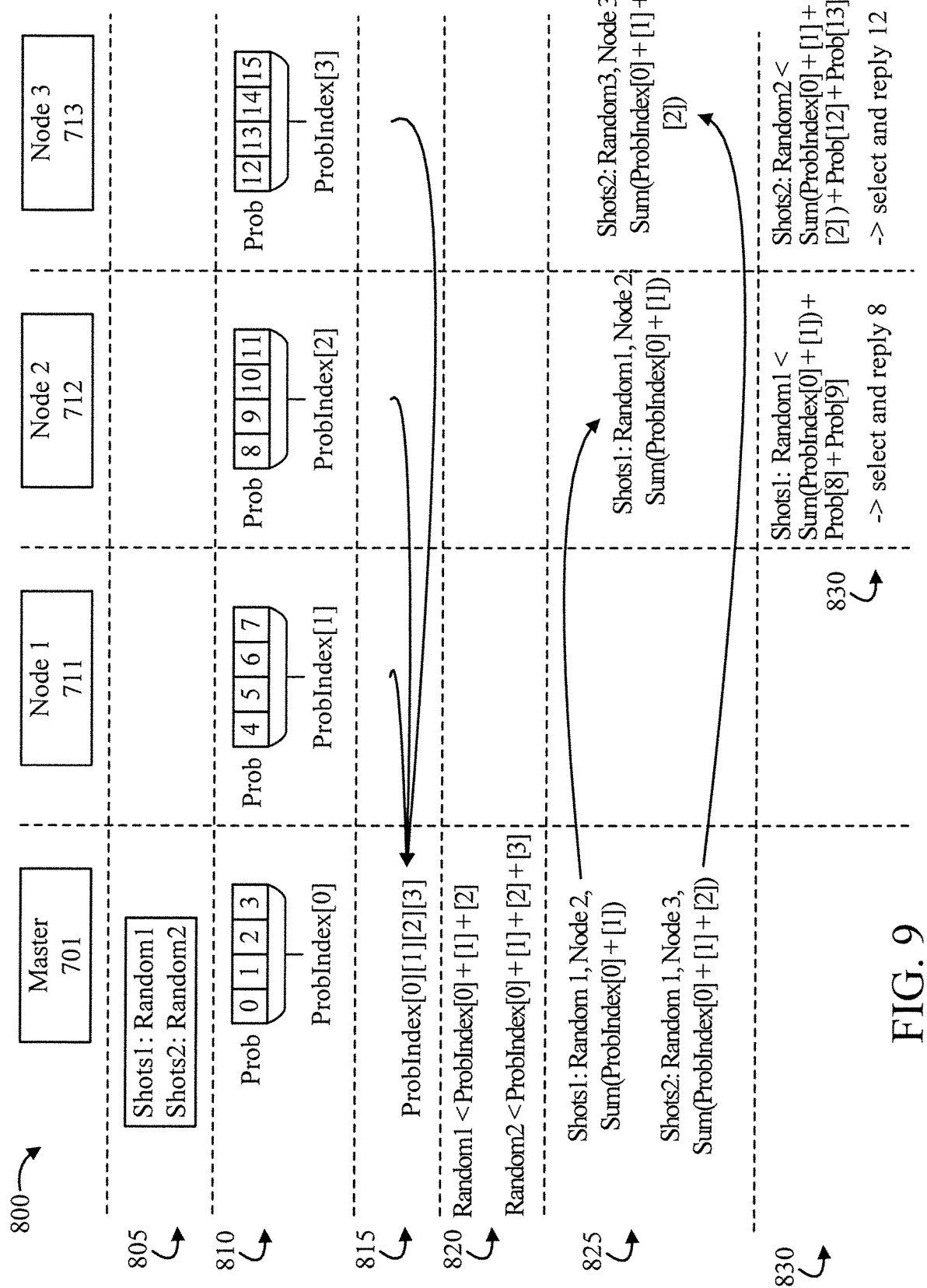
FIG. 9 is a diagram graphically illustrating the method of FIG. 8, in accordance with an embodiment of the present invention.

FIG. 8 is a flow diagram showing another exemplary method 800 for index creation and measurement for multiple nodes (multi-node), in accordance with an embodiment of the present invention. FIG. 9 is a diagram graphically illustrating the method 800 of FIG. 8, in accordance with an embodiment of the present invention. For the sake of illustration, FIG. 9 shows a master node and slave nodes 1-3, respectively denoted by figure reference numerals 901, 911, 912, and 913, respectively.

At block 805, generate, by the master node 901, shot times of the random numbers, and sends the shot times of the random numbers to each of the slave nodes 911, 912, and 913.

At block 810, calculate, by each slave node 911, 9812, and 913, an index of probability relative to local probability states.

At block 815, gather, by the master node 901, the indexes from the slave nodes 911, 912, and 013.

At block 820, calculate, by the master node 901, the sum of indexes and select the index which is greater than the random number.

At block 825, send, by the master node 901, the selected index, the sum of index probabilities, and the random number to a selected one of the slave nodes 911, 912, and 913 which has the selected index.

At block 830, calculate, by the local node having the selected index, each state probability with the sum of indexes and reply to the master node 901.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
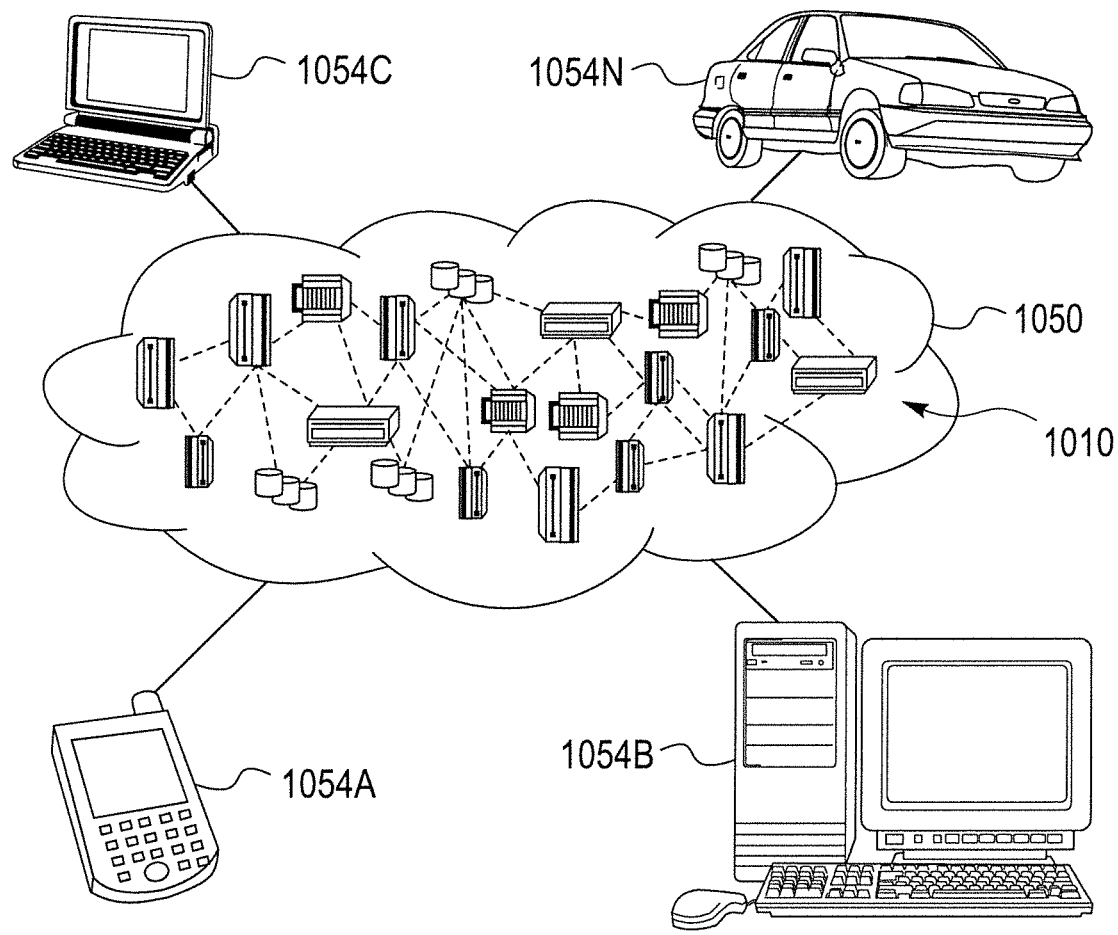
FIG. 10 is a block diagram showing an illustrative cloud computing environment having one or more cloud computing nodes with which local computing devices used by cloud consumers communicate, in accordance with an embodiment of the present invention.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
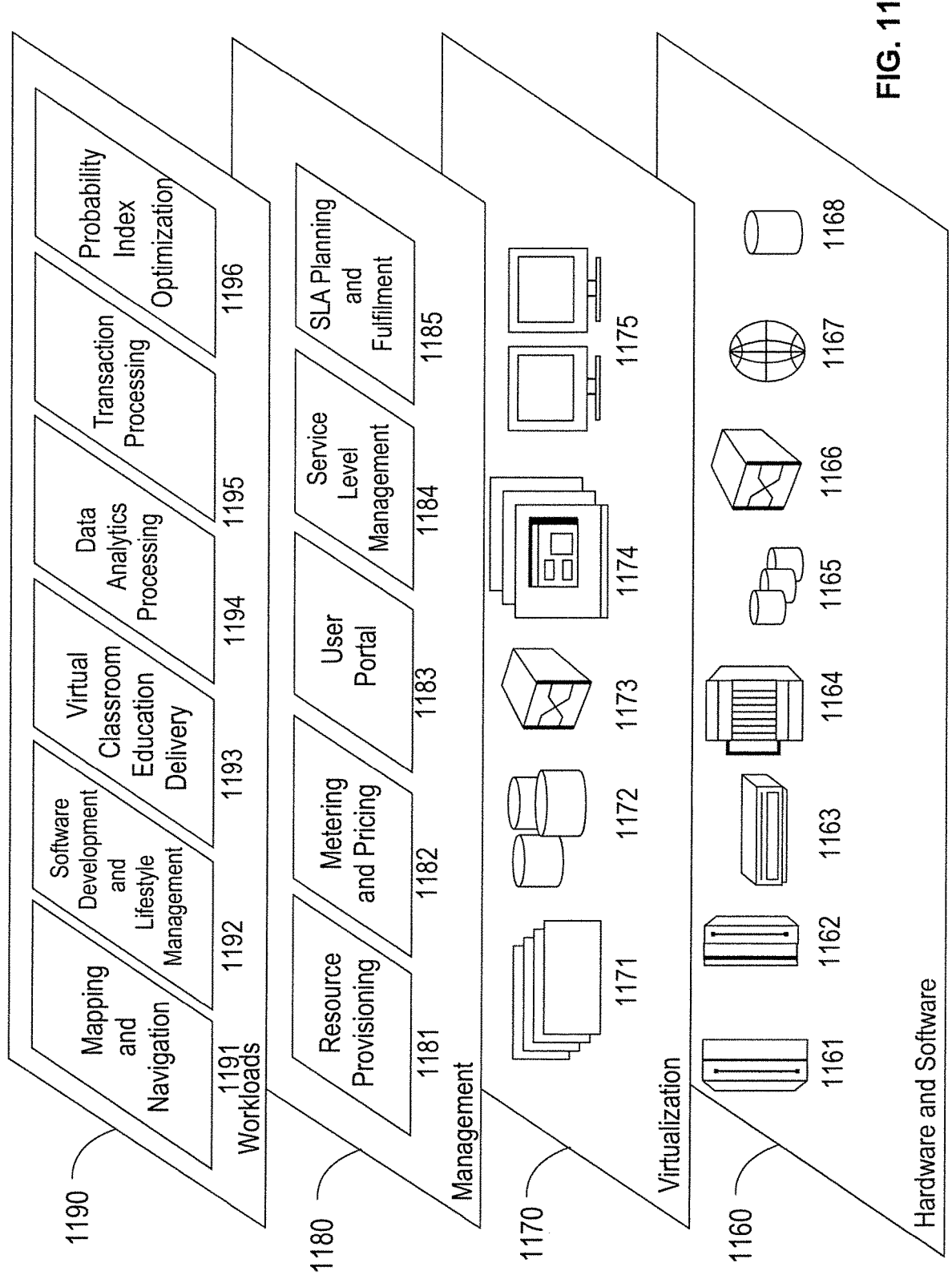
FIG. 11 is a block diagram showing a set of functional abstraction layers provided by a cloud computing environment, in accordance with an embodiment of the present invention.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and probability index optimization for multi-shot simulation in Quantum Computing (QC) 1196.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for reducing a measure time of a measure process in a multi-shot simulation performed by a quantum computing simulation system, the method comprising:
    calculating probabilities of qubits being a 0 or a 1 for the measure process from probability amplitudes before the measure process;
    creating, for each node of the quantum computing simulation system, an index of probability by incrementally summing respective different ones of the probabilities into respective sums;
    generating a random number for each of the multi-shots, the random number for sampling a probability distribution of the probabilities; and
    selecting the index of probability which is larger than the random number by comparing the random number generated for a given one of the multi-shots to the index of probability created for the given one of the multi-shots,
    wherein the quantum computing simulation system comprises a master node and local slave nodes, and wherein the creating and generating steps are performed by the master node, and the calculating and selecting steps are performed by the local slave nodes.

2. The computer-implemented method of claim 1, wherein a measure gate of the quantum computing simulation system performs the measure process, and the method is configured to begin responsive a satisfaction of a set of conditions, the set of conditions including that the measure gate is in a non-middle position.

3. The computer-implemented method of claim 1, further comprising calculating a state probability, as an output of the measure process, using the index of probability which is larger than the random number.

4. The computer-implemented method of claim 1, wherein the quantum computing simulation system comprises a plurality of nodes including a master node and multiple local nodes, wherein the index of probability of each of the plurality of nodes is different with respect to each other.

5. The computer-implemented method of claim 4, wherein each of the multiple local nodes calculates a respective one of the respective sums from the respective index of probability corresponding thereto as the value that is compared to the random number.

6. The computer-implemented method of claim 4, wherein the master nodes generates the random number for each of the multi-shots and sends the random number for each of the multi-shots to each of the local nodes for comparison to the index of probability thereof.

7. The computer-implemented method of claim 4, further comprising sending an index number and a shot number to the master node from only whichever of the local nodes has the index of probability larger than the random number.

8. The computer-implemented method of claim 1, wherein said selecting step compares the random number generated for the given one of the multi-shots to a given one of the respective sums forming the index of probability created for the given one of the multi-shots.

9. A computer program product for reducing a measure time of a measure process in a multi-shot simulation performed by a quantum computing simulation system, the computer program product comprising a non-transitory computer readable storage medium having program instructions embodied therewith, the program instructions executable by a computer to cause the computer to perform a method comprising:
    calculating probabilities of qubits being a 0 or a 1 for the measure process from probability amplitudes before the measure process;
    creating, for each node of the quantum computing simulation system, an index of probability by incrementally summing respective different ones of the probabilities into respective sums;
    generating a random number for each of the multi-shots, the random number for sampling a probability distribution of the probabilities; and
    selecting the index of probability which is larger than the random number by comparing the random number generated for a given one of the multi-shots to the index of probability created for the given one of the multi-shots,
    wherein the quantum computing simulation system comprises a master node and local slave nodes, and wherein the creating and generating steps are performed by the master node, and the calculating and selecting steps are performed by the local slave nodes.

10. The computer program product of claim 9, wherein a measure gate of the quantum computing simulation system performs the measure process, and the method is configured to begin responsive a satisfaction of a set of conditions, the set of conditions including that the measure gate is in a non-middle position.

11. The computer program product of claim 9, wherein the method further comprises calculating a state probability, as an output of the measure process, using the index of probability which is larger than the random number.

12. The computer program product of claim 9, wherein the quantum computing simulation system comprises a plurality of nodes including a master node and multiple local nodes, wherein the index of probability of each of the plurality of nodes is different with respect to each other.

13. The computer program product of claim 12, wherein each of the multiple local nodes calculates a respective one of the respective sums from the respective index of probability corresponding thereto as the value that is compared to the random number.

14. The computer program product of claim 12, wherein the master nodes generates the random number for each of the multi-shots and sends the random number for each of the multi-shots to each of the local nodes for comparison to the index of probability thereof.

15. The computer program product of claim 12, wherein the method further comprises sending an index number and a shot number to the master node from only whichever of the local nodes has the index of probability larger than the random number.

16. The computer program product of claim 9, wherein said selecting step compares the random number generated for the given one of the multi-shots to a given one of the respective sums forming the index of probability created for the given one of the multi-shots.

17. A quantum computing simulation system for reducing a measure time of a measure process in a multi-shot simulation, the system comprising:
- a set of local nodes for calculating probabilities of qubits being a 0 or a 1 for the measure process from probability amplitudes before the measure process;
- a master node for creating, for each of the nodes from among the master and local nodes, an index of probability by incrementally summing respective different ones of the probabilities into respective sums, and generating a random number for each of the multi-shots, the random number for sampling a probability distribution of the probabilities; and
- wherein the local nodes select the index of probability which is larger than the random number by comparing the random number generated for a given one of the multi-shots to the index of probability created for the given one of the multi-shots.

18. The quantum computing simulation system of claim 17, wherein only whichever of the local nodes has the index of probability larger than the random number sends an index number and a shot number to the master node.

* * * * *